US012516802B2

(12) United States Patent
Luo et al.

(10) Patent No.: US 12,516,802 B2
(45) Date of Patent: Jan. 6, 2026

(54) LIGHTING APPARATUS

(71) Applicant: LEEDARSON LIGHTING CO., LTD., Fujian (CN)

(72) Inventors: Xizhong Luo, Fujian (CN); Xiaobo Chen, Fujian (CN); Tian Zhang, Fujian (CN); Zongyuan Liu, Fujian (CN); Xiaoping Cai, Fujian (CN)

(73) Assignee: LEEDARSON LIGHTING CO., LTD., Zhangzhou (CN)

(*) Notice: Subject to any disclaimer, the term of this patent is extended or adjusted under 35 U.S.C. 154(b) by 1 day.

(21) Appl. No.: 18/974,496

(22) Filed: Dec. 9, 2024

(65) Prior Publication Data

US 2025/0189112 A1 Jun. 12, 2025

(30) Foreign Application Priority Data

Dec. 7, 2023 (CN) ......................... 202323343458.0

(51) Int. Cl.
*F21V 23/04* (2006.01)
*H04R 1/02* (2006.01)
*F21Y 115/10* (2016.01)

(52) U.S. Cl.
CPC ............ *F21V 23/04* (2013.01); *H04R 1/028* (2013.01); *F21Y 2115/10* (2016.08)

(58) Field of Classification Search
CPC ...... F21V 23/04; F21V 23/00; F21V 23/0414; F21V 23/0421; F21V 23/0428; H04R 1/028; F21Y 2115/10
See application file for complete search history.

(56) References Cited

U.S. PATENT DOCUMENTS 11,871,491 B1 * 1/2024 Chen .................... F21V 29/503
11,873,979 B1 * 1/2024 Chen ......................... F21S 8/04

* cited by examiner

*Primary Examiner* — Bao Q Truong
(74) *Attorney, Agent, or Firm* — LANWAY IPR SERVICES; Chun-Ming Shih

(57) ABSTRACT

A lighting apparatus includes a LED light source, a driver circuit, a light source plate and a manual switch module. The LED light source and the driver circuit are mounted on a front side. The light source plate has a switch hole. The manual switch module has a switch body, a switch electrode, a movable area, and a manual lever. The manual lever passes through the switch hole and protruding above a back side of the light source. The switch body is disposed on the front side of the light source plate. The switch electrode is attached on the front side of the light source plate and electrically connected to the driver circuit. The manual lever is movable within the movable area to adjust a setting of the driver circuit.

20 Claims, 8 Drawing Sheets

LIGHTING APPARATUS

FIELD

The present invention is related to a lighting apparatus, and more particularly related to a lighting apparatus with a flexible configuration.

BACKGROUND

LED technology has become a cornerstone in modern lighting solutions, transforming how people illuminate their environments. Initially used for simple indicator lights, LEDs have evolved into versatile light sources that power an array of devices in both commercial and residential settings. The demand for efficient, durable, and adaptable lighting has driven LED innovation, making these devices a preferred choice across industries.

LEDs are widely incorporated into various light device designs, offering flexibility for different applications. Whether in homes, offices, outdoor spaces, or industrial facilities, LEDs provide efficient and reliable illumination tailored to the specific needs of each location. Their adaptability has enabled designers to create light devices that can meet the unique requirements of diverse environments and tasks.

The widespread application of LED technology has revolutionized lighting across sectors. In residential spaces, LEDs provide soft, ambient lighting for relaxation, while commercial spaces utilize them for bright, focused illumination suited for productivity. In outdoor settings, LEDs are essential for their durability and energy efficiency, particularly in street lighting and landscape lighting.

As LED technology has advanced, so has the focus on developing specialized light devices that cater to different lighting needs. Today, LED light devices are available in a variety of shapes, colors, and intensities, making them suitable for everything from decorative lighting to high-intensity work lights. This versatility has allowed LED devices to replace many conventional lighting solutions.

Cost is a critical consideration in the development and adoption of LED light devices. LEDs, while initially more expensive than traditional lighting, offer long-term savings through reduced energy consumption and minimal maintenance. This cost-effectiveness has encouraged wider adoption, with LED prices continuing to decrease as production scales up, further enhancing their accessibility.

The innovation in LED technology is also motivated by the increasing demand for sustainable solutions. LEDs consume less energy than incandescent and fluorescent lighting, contributing to lower carbon emissions. This energy efficiency aligns with global efforts to reduce environmental impact, making LEDs a valuable choice for eco-conscious consumers and businesses alike.

People use a variety of LED light devices to suit specific locations and preferences. Adjustable LED fixtures, for example, allow users to modify brightness and color temperature based on the task or mood. From warm, welcoming lights for living spaces to bright, precise lighting for work environments, LEDs provide customizable solutions that enhance user experience.

Innovation in LED technology continues to drive improvements in lighting quality and efficiency. Manufacturers constantly seek new ways to enhance LED performance, focusing on brightness, color accuracy, and energy conservation. These improvements not only meet consumer demand but also push the boundaries of what light devices can achieve, enabling applications previously impossible with conventional lighting.

The widespread use of LEDs reflects their value in everyday life. With applications ranging from headlights in vehicles to emergency lighting in public spaces, LEDs play a crucial role in safety and convenience. Their reliability in various conditions further solidifies LEDs as an essential component in modern light device design.

LED technology has transformed the lighting landscape, providing efficient, adaptable, and sustainable solutions for diverse applications. The continuous advancement of LEDs and the focus on innovation have led to the creation of light devices that not only meet but exceed user expectations. As the LED industry grows, so does the potential for new applications that improve how people interact with their illuminated environments.

Providing users with more flexible control over their light devices enhances convenience and usability. Modern lifestyles often demand customizable lighting solutions that cater to varying activities and moods. Flexible control allows users to adjust brightness, color temperature, and even the direction of light according to specific needs. This capability not only improves functionality but also contributes to a more comfortable and personalized living or working environment.

Flexible control of light devices also supports energy efficiency and sustainability. Users can optimize light usage by dimming lights or turning them off when not required, reducing unnecessary energy consumption. Advanced control systems, such as smart sensors and timers, further enable automatic adjustments based on ambient light levels or occupancy. These features ensure that energy is used judiciously, aligning with the global emphasis on reducing carbon footprints and promoting sustainable living.

Moreover, advanced control over lighting devices improves accessibility for individuals with specific needs. Remote controls, voice commands, and mobile applications provide intuitive interfaces that accommodate users of all abilities. This inclusivity empowers people with limited mobility or vision to manage lighting easily and effectively. Flexible lighting solutions thus create an adaptable and user-friendly environment, making them an essential aspect of modern lighting design.

SUMMARY

In some embodiments, a lighting apparatus includes a LED light source, a driver circuit, a light source plate and a manual switch module.

The LED light source and the driver circuit are mounted on a front side.

The light source plate has a switch hole.

The manual switch module has a switch body, a switch electrode, a movable area, and a manual lever.

The manual lever passes through the switch hole and protruding above a back side of the light source.

The switch body is disposed on the front side of the light source plate.

The switch electrode is attached on the front side of the light source plate and electrically connected to the driver circuit.

The manual lever is movable within the movable area to adjust a setting of the driver circuit.

In some embodiments, the light source plate has a central area and a peripheral area.

The driver circuit is disposed in the peripheral area.

The LED light source is placed at the central area.

In some embodiments, the lighting apparatus may also include a reflective unit.

The reflective unit has a bottom opening and a top opening.

The top opening has a larger diameter than the bottom opening.

The LED light source emit a light from the bottom opening of the reflective unit to the top opening.

In some embodiments, a portion of the manual lever is exposed outside a light housing In some embodiments, the manual switch module further includes two conductive clips disposed on the switch body.

The two conductive clips correspond one-to-one with two sets of pin wires.

Each conductive clip clamps one end of the corresponding set of pin wires extending into the exterior housing.

In some embodiments, a side wall of the switch body near the first side is recessed to form two grooves.

Each conductive clip is snap-fitted into one of the grooves.

In some embodiments, the top plate is embedded in the switch body, the two clamping plates are positioned within the grooves.

The middle portion of each clamping plate is arched toward the other clamping plate to form a clamping portion, and the clamping portions of the two clamping plates cooperate to clamp the corresponding set of pin wires.

In some embodiments, one end of the pin wires extending out of the exterior housing is provided with a first connection segment.

One end of the first connection segment is fixedly connected to the pin wires, and the other end extends in a direction away from the handle.

In some embodiments, the other end of the first connection segment is sequentially provided with a second connection segment and a third connection segment.

The second connection segment is parallel to the pin wires, and the third connection segment is parallel to the first connection segment.

In some embodiments, further includes a stopper fixedly connected to the first side of the exterior housing.

The stopper includes a second through-hole corresponding vertically to the first through-hole, and the pin wires and the first connection segment are embedded in the stopper.

In some embodiments, both opposite side walls of the stopper are recessed to form through-slots corresponding one-to-one with the two sets of pin wires.

Each through-slot includes a stepped surface, and the stepped surfaces are respectively attached to the first connection segment and the second connection segment.

In some embodiments, the stopper is a plastic component or an iron component.

In some embodiments, the switch body is attached with the exterior housing, where a safety distance more than 1.8 mm exists between the switch body and the exterior housing.

In some embodiments, the lighting apparatus may also include a light housing.

The light source plate and the reflective unit are disposed in the light housing.

Light housing and the reflective unit defines a concealing space.

The driver circuit is placed in the concealing space.

In some embodiments, the light housing has a surface rim to cover an installation hole.

The light housing forms a downlight device shape.

In some embodiments, the driver circuit is concealed by the reflective unit and thus invisible from the top opening of the reflective unit.

In some embodiments, the reflective unit is used as a vibrating diaphragm of a speaker.

In some embodiments, a speaker circuit is placed in the concealing space.

In some embodiments, the concealing space is used as a resonance box for enhancing and amplifying a sound wave driven by the speaker circuit.

In some embodiments, a bass reflex port is disposed between the light source plate and the reflective unit.

DETAILED DESCRIPTION

Figure 8:
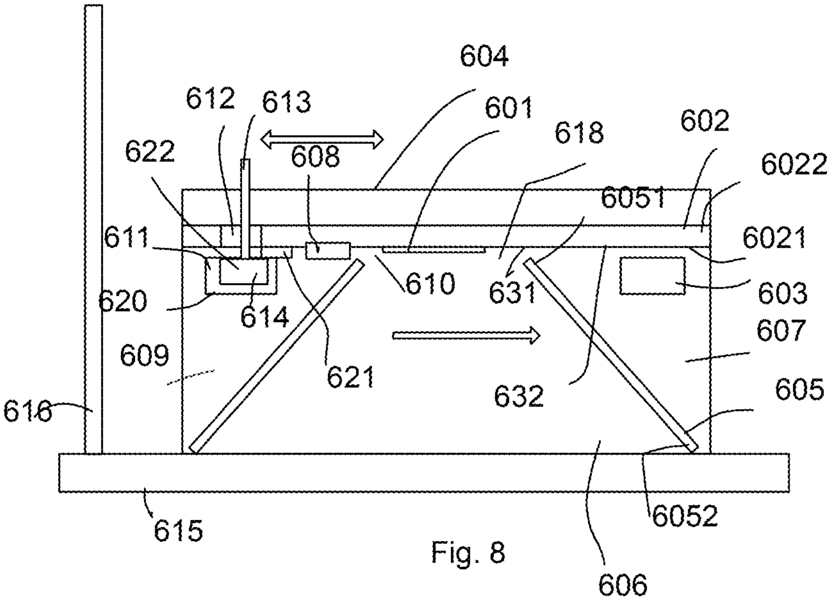
FIG. 8 illustrates another embodiment of a lighting apparatus.

In FIG. 8, a lighting apparatus includes a LED light source 601, a driver circuit 603, a light source plate 602 and a manual switch module 620.

The LED light source 601 and the driver circuit 603 are mounted on a front side 6021.

The light source plate 602 has a switch hole 612.

The manual switch module 620 has a switch body 614, a switch electrode 621, a movable area 622, and a manual lever 613.

The manual lever 613 passes through the switch hole 612 and protruding above a back side 6022 of the light source plate 602.

The switch body 614 is disposed on the front side 6021 of the light source plate 602.

The switch electrode 621 is attached on the front side 6021 of the light source plate 602 and electrically connected to the driver circuit 603.

The manual lever 613 is movable within the movable area 622 to adjust a setting of the driver circuit 603.

Adjustable settings in LED light devices allow users to tailor the lighting experience to suit various needs and preferences. One of the most significant advantages is the ability to control color temperatures. By adjusting between warm white tones for relaxation and cool white tones for productivity, users can create an atmosphere that matches specific tasks or moods. This flexibility ensures that a single lighting device can serve multiple purposes, from enhancing focus during work to fostering a cozy ambiance in the evening.

Incorporating multiple types of LED modules in a single light device provides even greater versatility. By combining LEDs with different characteristics, such as RGB modules for color mixing and tunable white LEDs for adjustable temperatures, users can achieve a wide range of lighting effects. This approach allows precise customization of light parameters, including hue, saturation, and intensity, to create the desired environment. It is particularly useful in applications requiring dynamic lighting, such as architectural illumination or entertainment venues.

The ability to mix and match LED modules not only enhances aesthetics but also improves functionality. For example, combining high-color-rendering LEDs with standard modules ensures accurate color representation in environments where detail and precision are critical, such as art studios or retail displays. Users can further optimize the lighting for specific tasks by programming settings to automatically adjust based on time of day or user activity, offering both convenience and practicality.

Energy efficiency is another key benefit of adjustable settings in LED modules. By fine-tuning brightness levels or selectively activating specific LEDs, users can reduce power consumption without compromising on light quality. Additionally, the integration of smart control systems enables automatic optimization of energy usage, such as dimming lights when natural daylight is sufficient or turning off unused modules. These features contribute to lower energy costs and support sustainable practices.

Moreover, adjustable settings improve the accessibility and user experience of LED lighting devices. Advanced controls, such as mobile apps or voice commands, allow users to manage light parameters with ease. This accessibility ensures that anyone, regardless of physical ability or technical knowledge, can enjoy the benefits of personalized lighting. The combination of flexibility, efficiency, and usability makes adjustable LED light devices an essential component of modern living spaces.

In some embodiments, the light source plate has a central area 631 and a peripheral area 632.

The driver circuit 603 is disposed in the peripheral area 632.

The LED light source 601 is placed at the central area 631.

In some embodiments, the lighting apparatus may also include a reflective unit 605.

The reflective unit 605 has a bottom opening 6051 and a top opening 6052.

The top opening 6052 has a larger diameter than the bottom opening 6051.

The LED light source 601 emit a light from the bottom opening 6051 of the reflective unit 605 to the top opening 606.

In some embodiments, a portion of the manual lever 613 is exposed outside a light housing 604.

In some embodiments, the manual switch module 620 further includes two conductive clips disposed on the switch body.

The two conductive clips correspond one-to-one with two sets of pin wires.

Each conductive clip clamps one end of the corresponding set of pin wires extending into the exterior housing.

In some embodiments, a side wall of the switch body near the first side is recessed to form two grooves.

Each conductive clip is snap-fitted into one of the grooves.

In some embodiments, the top plate is embedded in the switch body, the two clamping plates are positioned within the grooves.

The middle portion of each clamping plate is arched toward the other clamping plate to form a clamping portion, and the clamping portions of the two clamping plates cooperate to clamp the corresponding set of pin wires.

In some embodiments, one end of the pin wires extending out of the exterior housing is provided with a first connection segment.

One end of the first connection segment is fixedly connected to the pin wires, and the other end extends in a direction away from the handle.

In some embodiments, the other end of the first connection segment is sequentially provided with a second connection segment and a third connection segment.

The second connection segment is parallel to the pin wires, and the third connection segment is parallel to the first connection segment.

In some embodiments, further includes a stopper fixedly connected to the first side of the exterior housing.

The stopper includes a second through-hole corresponding vertically to the first through-hole, and the pin wires and the first connection segment are embedded in the stopper.

In some embodiments, both opposite side walls of the stopper are recessed to form through-slots corresponding one-to-one with the two sets of pin wires.

Each through-slot includes a stepped surface, and the stepped surfaces are respectively attached to the first connection segment and the second connection segment.

In some embodiments, the stopper is a plastic component or an iron component.

In some embodiments, the switch body is attached with the exterior housing, where a safety distance more than 1.8 mm exists between the switch body and the exterior housing.

In some embodiments, the lighting apparatus may also include a light housing 604.

The light source plate and the reflective unit are disposed in the light housing 604.

Light housing and the reflective unit defines a concealing space 607.

The driver circuit 603 is placed in the concealing space 607.

In some embodiments, the light housing has a surface rim 615 to cover an installation hole that defines by a platform 618, like a cavity in the ceiling.

The light housing forms a downlight device shape.

In some embodiments, the driver circuit 603 is concealed by the reflective unit 605 and thus invisible from the top opening of the reflective unit 605.

In some embodiments, the reflective unit 605 is used as a vibrating diaphragm of a speaker.

In some embodiments, a speaker circuit 608 is placed in the concealing space 607.

In some embodiments, the concealing space is used as a resonance box for enhancing and amplifying a sound wave driven by the speaker circuit 608.

In some embodiments, a bass reflex port 610 is disposed between the light source plate and the reflective unit.

Compared to the prior art, in the embodiment of this application, after installing the light engine board into the face ring, the inverted DIP switch is installed on the light engine board. The switch handle of the DIP switch passes through the fourth through-hole and the third through-hole to extend out from the side of the face ring opposite to the light-emitting direction. The pin wires of the DIP switch connect to the light engine board. After connection, the reflector cup and light-transmitting cover are installed. The assembly can be used normally after completion. In this utility model, the DIP switch is installed in an inverted manner, with the handle directly extending out from the side of the face ring opposite to the light-emitting direction. No transition component is needed. Compared to having the handle inside the lighting apparatus, the DIP switch in this embodiment occupies less space inside the lighting apparatus. The overall volume of the lighting apparatus can be reduced accordingly, making it more suitable for indoor installation. The cost is also lower, allowing for a lower price and easier promotion.

To make the technical problems, technical solutions, and beneficial effects of this utility model clearer, the following detailed description is provided with reference to the drawings and embodiments. It should be understood that the specific embodiments described here are only used to explain this utility model and are not intended to limit this utility model.

Please refer to FIG. 1 to FIG. 7 for an explanation of the inverted DIP switch provided by this utility model. The inverted DIP switch includes an exterior housing 10, a manual switch module 20, and a pin module 30. The manual switch module 20 includes a switch body 21 set inside the exterior housing 10 and a handle 22 connected at one end to the switch body 21 and extending out from the first side of the exterior housing 10. The pin module 30 includes a pin board 31 fixed to the first side of the exterior housing 10 and two groups of pin wires 32 connected to the pin board 31. The pin board 31 has a first through-hole 36 for the handle 22 to pass through. One end of the pin wires 32 is electrically connected to the switch body 21, and the other end extends outside the exterior housing 10 for connection to the PCB board of the lighting apparatus.

The switch body 21, when installed in the exterior housing 10, can maintain a safety distance of 1.8 mm from the exterior housing 10.

In this embodiment, compared to the prior art, when in use, the switch body 21 is installed facing downward (downward means facing the light-emitting direction, same below) with the PCB board inside the lighting apparatus. This means the pin wires 32 of the pin module 30 are electrically connected to the corresponding interfaces on the PCB board. After installation, the handle 22 of the manual switch module 20 faces upward (upward means away from the light-emitting direction, same below). The handle 22 can directly pass through the exterior housing 10 to extend outside. When color temperature control is needed, the handle 22 can be directly adjusted. This utility model's inverted DIP switch can be directly installed in an inverted manner without needing transition components to connect with the handle 22, making the structure simpler, installation more convenient, and cost lower. In traditional DIP switches, since the handle 22 is installed facing downward, the pins are usually installed on the opposite side of the handle 22. In this application's embodiment, the pin wires 32 and handle 22 are on the same side of the exterior housing 10, which reduces the overall height of the DIP switch, making it smaller in volume and occupying less space when installed in the lighting apparatus.

In some embodiments, one specific connection method between the above manual switch and pin module 30 can adopt the structure shown in FIG. 1 to FIG. 3 and FIG. 7. Referring to FIG. 1 to FIG. 3 and FIG. 7, the manual switch module 20 also includes two conductive clips 40 set on the switch body 21. The two conductive clips 40 correspond one-to-one with the two groups of pin wires 32, with each conductive clip 40 clamping the end of the corresponding group of pin wires 32 that extends into the exterior housing 10. Through the connection between conductive clips 40 and pin wires 32, one end of the pin wires 32 connects to the circuit inside the manual switch module 20, and the other end connects to the circuit in the PCB board. The pin wires 32 can be directly inserted into the conductive clips 40, making installation convenient and operation more flexible.

It should be noted that one conductive clip 40 corresponds to one group of pin wires 32. One group of pin wires 32 includes multiple conductors arranged at intervals along a straight path, with the ends of multiple conductors extending into the exterior housing 10 fixed on the same conductive clip 40.

In some embodiments, one improved implementation of the above switch body 21 can adopt the structure shown in FIG. 1 to FIG. 7. Referring to FIG. 1 to FIG. 7, the side wall of the switch body 21 facing the first side is recessed to form two grooves 23, with each conductive clip 40 snap-fitted into one groove 23. The conductive clip 40 is electrically connected to the corresponding circuit inside the switch body 21 and located within the groove 23. During assembly, this allows easy observation of the connection between the conductive clip 40 and pin wires 32 within the groove 23. Additionally, the inner wall of the groove 23 can limit the opening angle of the conductive clip 40 during installation, ensuring a firm connection between the conductive clip 40 and pin wires 32.

In some embodiments, one specific implementation of the above conductive clip 40 can adopt the structure shown in FIG. 1 to FIG. 3 and FIG. 7. Referring to FIG. 1 to FIG. 3 and FIG. 7, the conductive clip 40 includes a top plate 41 and two clamping plates 42 fixed to opposite sides of the top plate 41. The top plate 41 is embedded in the switch body 21, and the two clamping plates 42 are located within the groove 23. The middle portion of each clamping plate 42 protrudes toward the other clamping plate 42 to form a clamping portion 43. The clamping portions 43 of the two clamping plates 42 cooperate to clamp the corresponding group of pin wires 32. The two clamping plates 42 are actually formed by bending the opposite sides of the top plate 41, with the middle portions of both clamping plates 42 protruding. Thus, the distance between the two clamping portions 43 is less than the maximum distance between the two clamping plates 42. When the pin wires 32 are inserted between the two clamping portions 43, since the conductive clip 40 is made of elastic conductive metal material, the two clamping portions 43 can firmly clamp the pin wires 32. This facilitates installation while providing greater clamping force on the pin wires 32, preventing them from falling off during use.

Figure 1:
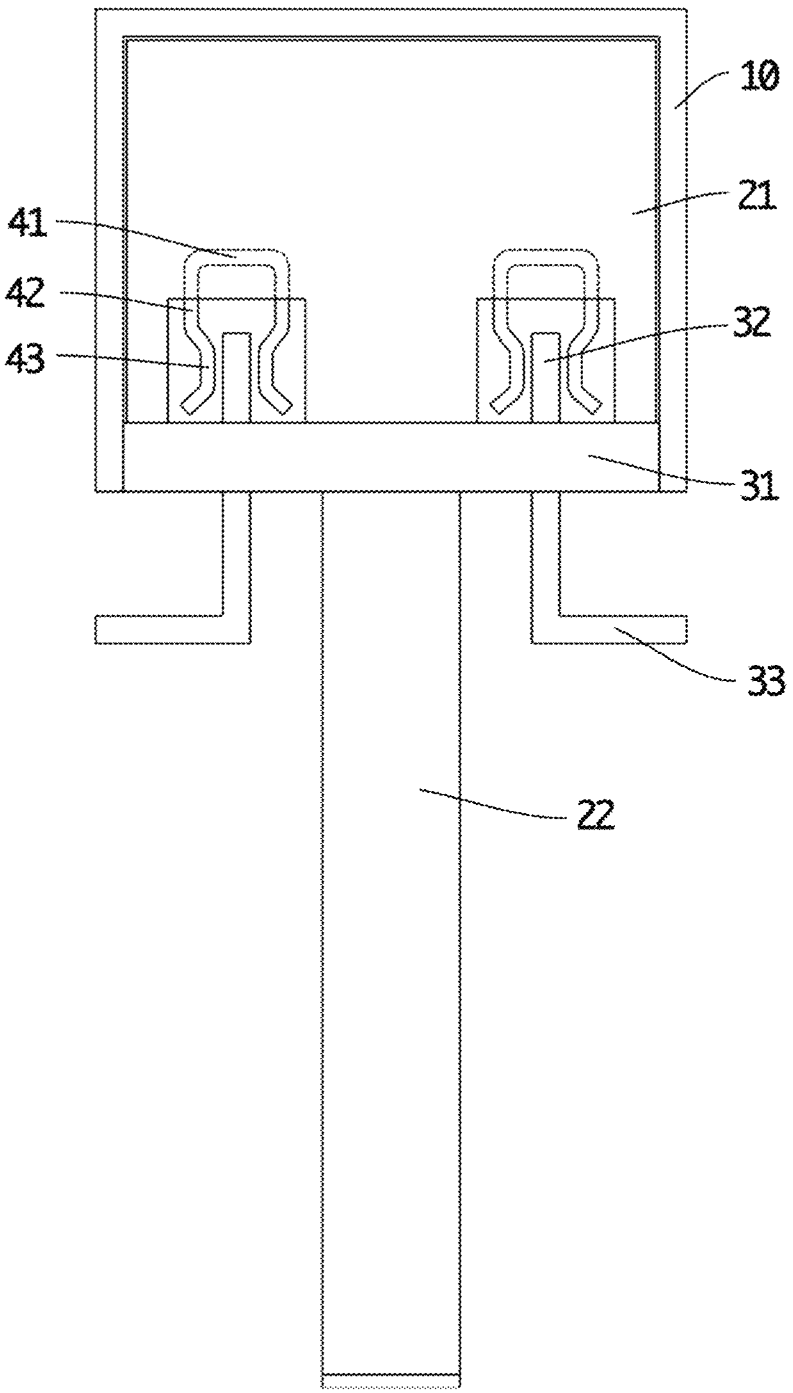
FIG. 1 illustrates an example of a manual switch module.
Figure 2:
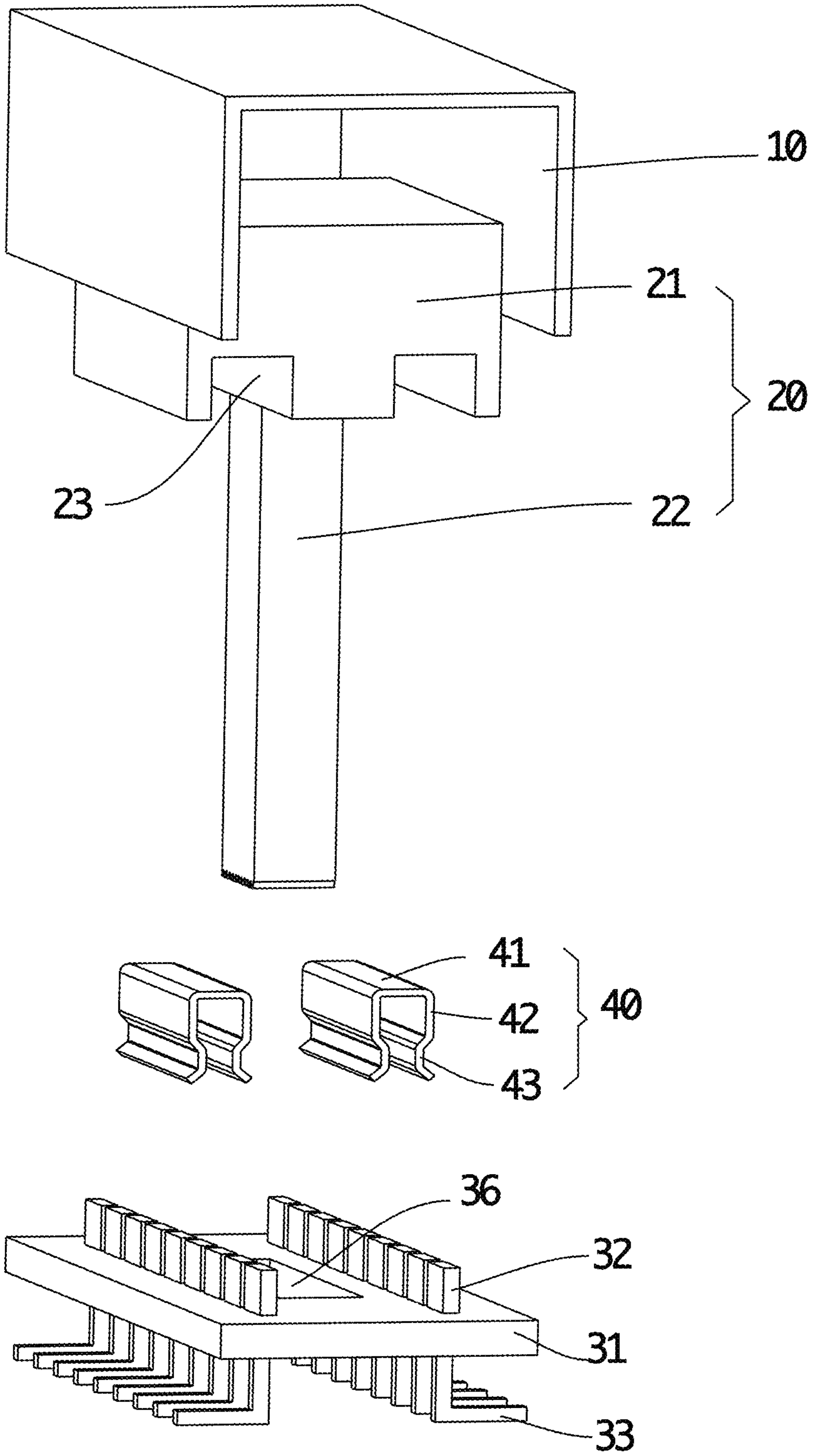
FIG. 2 illustrates a view of a part of the manual switch module.
Figure 3:
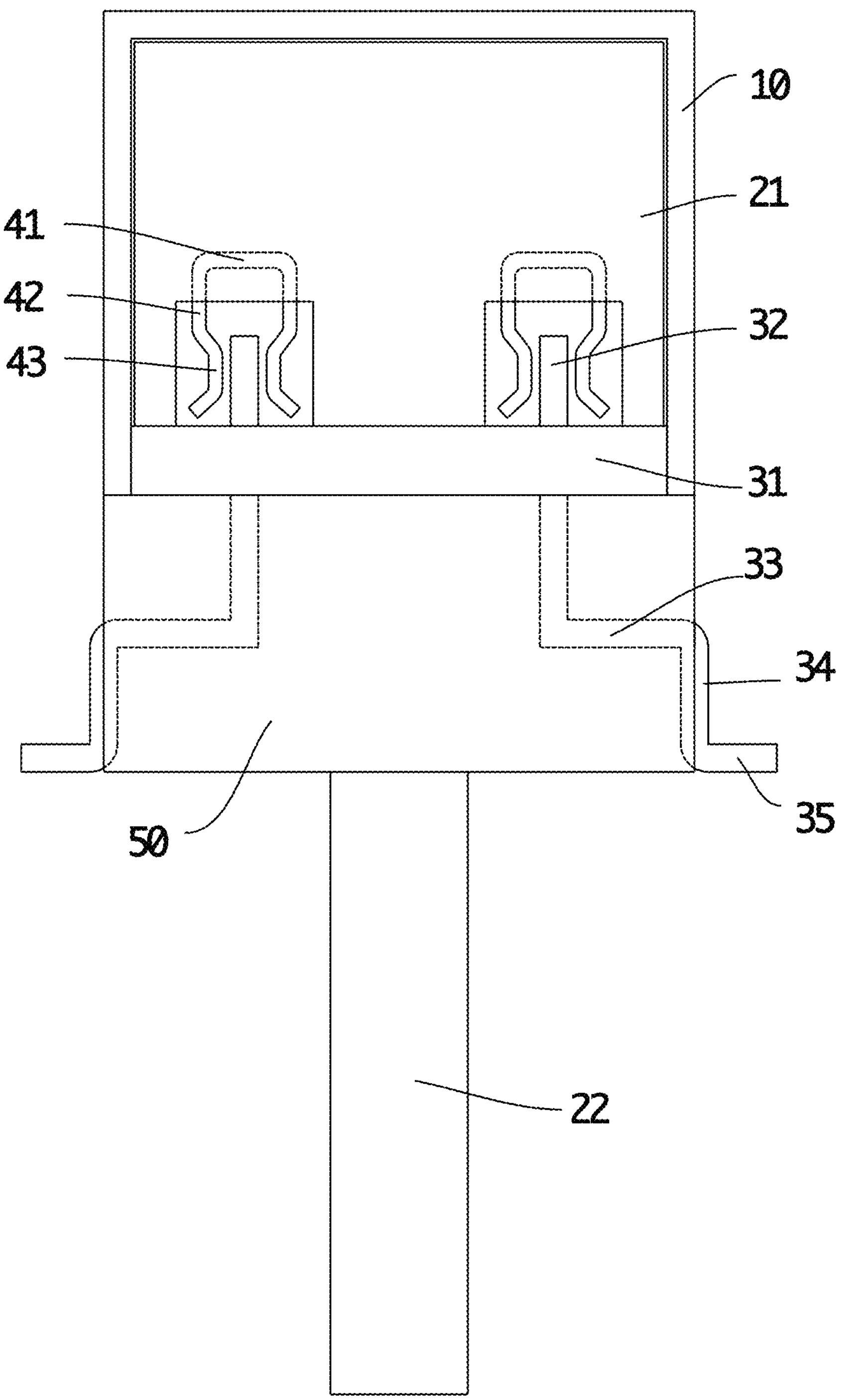
FIG. 3 illustrates a cross-sectional view of the example.
Figure 4:
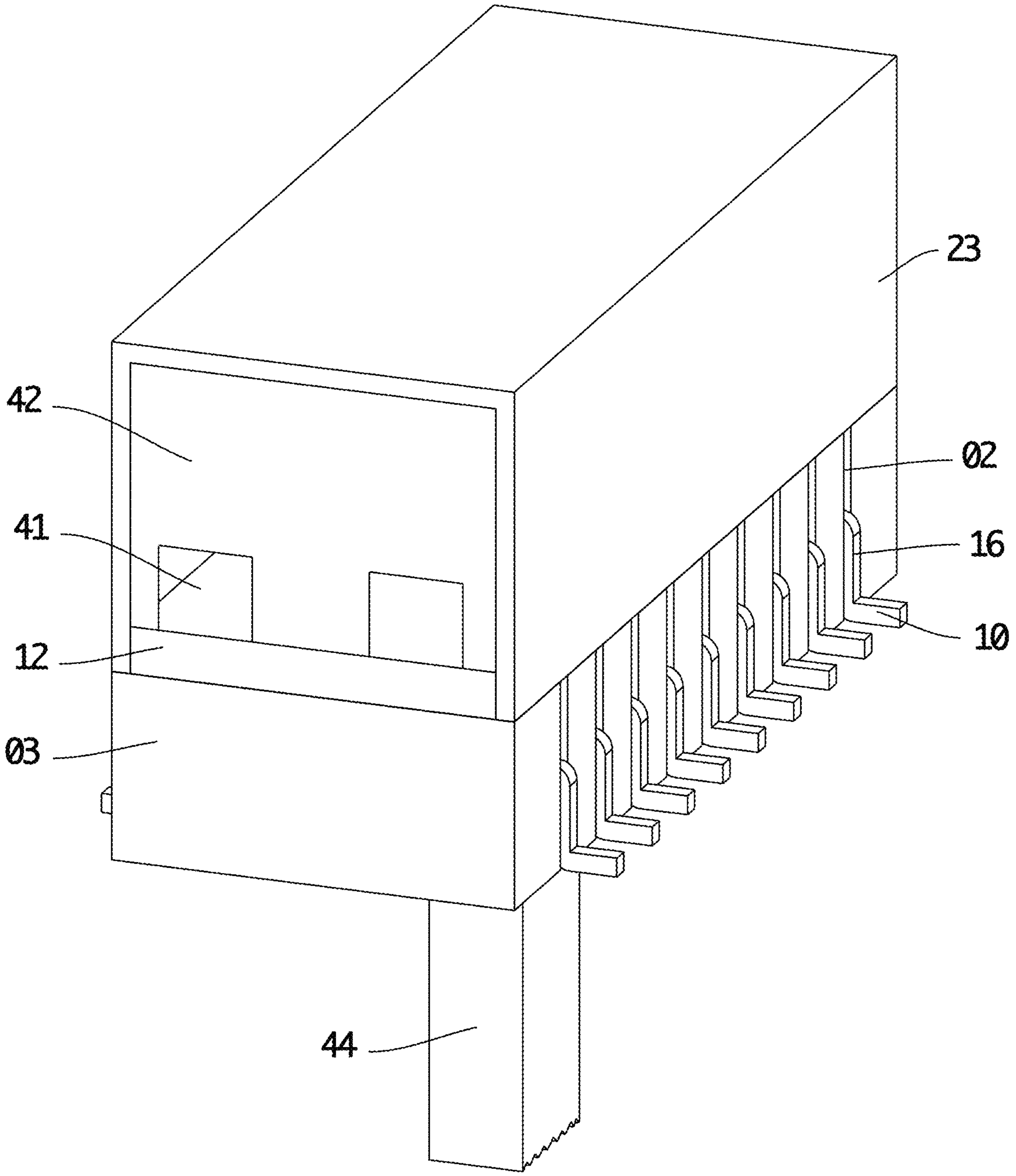
FIG. 4 illustrates another view of the example in FIG. 3.

In some embodiments, one improved implementation of the above pin wires 32 can adopt the structure shown in FIG. 1 to FIG. 2. Referring to FIG. 1 to FIG. 2, the end of the pin wires 32 extending out from the exterior housing 10 has a first connection segment 33. One end of the first connection segment 33 is fixed to the pin wires 32, and the other end extends in a direction away from the handle 22. Since there are two groups of pin wires 32 located on opposite sides of the handle 22, the first connection segment 33 of one group of pin wires 32 extends in the opposite direction from the first connection segment 33 of the other group. The two first connection segments 33 are used for connection with the PCB board. Connection through the two first connection segments 33 to the PCB board can increase the spacing between the connection points and the first through-hole 36, preventing accidental disconnection of the pin wires 32 when adjusting the handle 22.

In this embodiment, the pin wires 32 can form the first connection segment 33 with a single bend, effectively reducing deformation of the pin wires 32 and better controlling their flatness.

In some embodiments, one improved implementation of the above pin wires 32 can adopt the structure shown in FIG. 3 to FIG. 7. Referring to FIG. 3 to FIG. 7, the other end of the first connection segment 33 sequentially includes a second connection segment 34 and a third connection segment 35. The second connection segment 34 is parallel to the pin wires 32, and the third connection segment 35 is parallel to the first connection segment 33. That is, the end of the first connection segment 33 away from the pin wires 32 continuously bends in an L-shape multiple times to form the second connection segment 34 and third connection segment 35. Similarly, it can continue to bend multiple times following the same pattern. The formed third connection segment 35 is used for electrical connection with the PCB board, further increasing the distance between the connection points and the first through-hole 36. According to requirements, the distance between connection points and the first through-hole 36 can be set to 2 mm~3 mm. Due to multiple bends increasing the overall height of the pin wires 32, the number of bends needs to consider whether the internal space of the lighting apparatus allows it.

In some embodiments, one improved implementation of the above inverted DIP switch can adopt the structure shown in FIG. 3 to FIG. 7. Referring to FIG. 3 to FIG. 7, the inverted DIP switch also includes a stopper 50 fixed to the first side of the exterior housing 10. The stopper 50 has a second through-hole corresponding vertically to the first through-hole 36. The pin wires 32 and first connection segment 33 are both embedded in the stopper 50. When the first connection segment 33, second connection segment 34, and third connection segment 35 are present, the wire extends too long. Therefore, the stopper 50 fixes the wire to prevent it from hanging suspended and being easily broken by collision during installation. The stopper 50 wraps around the outer periphery of the pin wires 32 and first connection segment 33, while ensuring the third connection segment 35 can extend out for connection.

It should be noted that when the stopper 50 is present, both opposite side walls of the stopper 50 are recessed to form through-slots 51 corresponding one-to-one with the two groups of pin wires 32. The through-slots 51 have stepped surfaces 52 that respectively fit against the first connection segment 33 and second connection segment 34. Since the second connection segment 34 and third connection segment 35 extend outside, both the first connection segment 33 and second connection segment 34 fit against the stepped surfaces 52, preventing the second connection segment 34 and third connection segment 35 from swinging while suspended, facilitating the soldering operation between the third connection segment 35 and PCB board.

Optionally, the stopper 50 can be a plastic component or iron component. If the stopper 50 is an iron shell, it is cheaper while also being more miniaturized. Compared to plastic components, the iron shell can improve reliability and avoid plastic aging and deformation.

Figure 5:
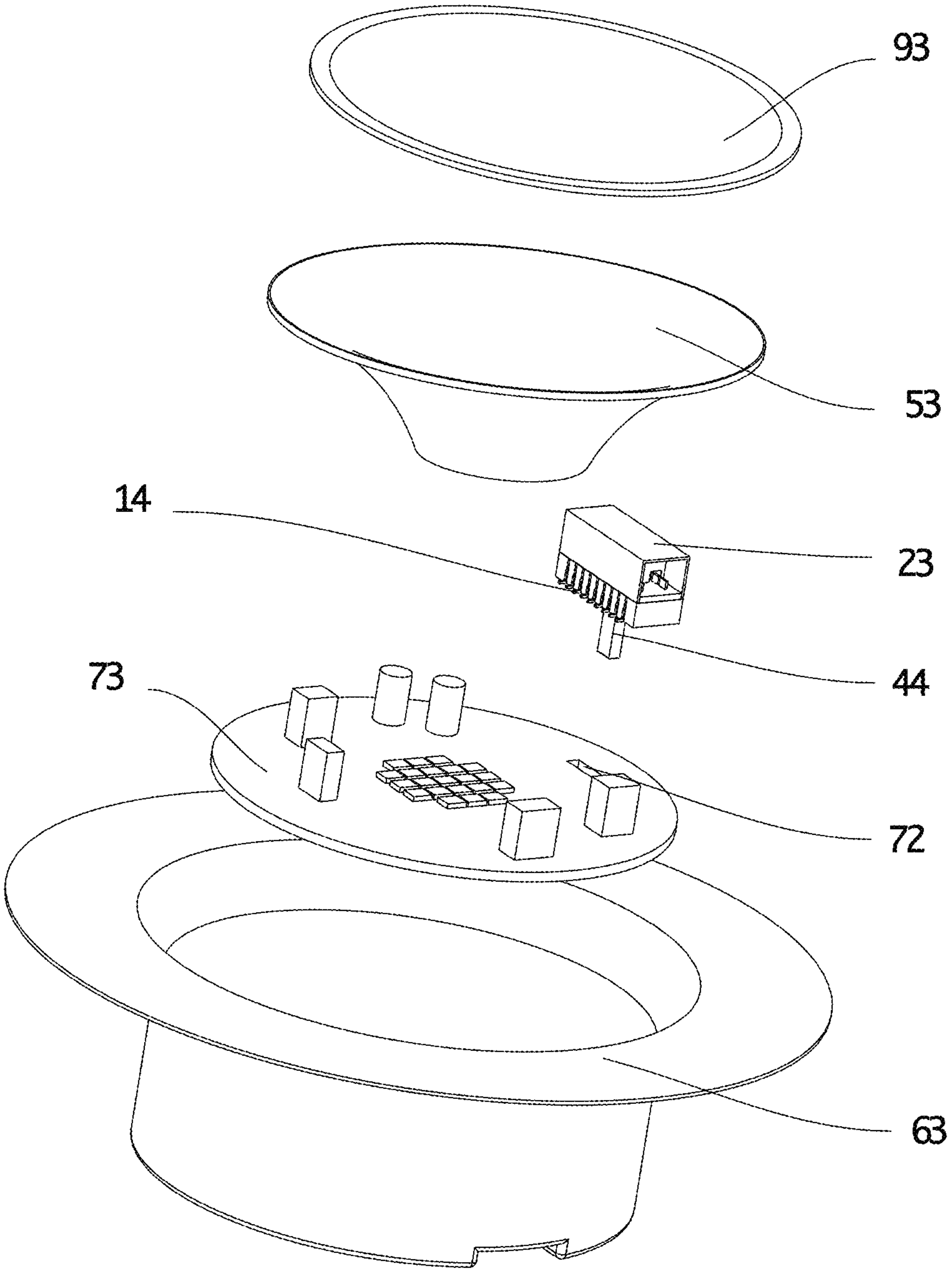
FIG. 5 illustrates an exploded view of a light apparatus embodiment.
Figure 6:
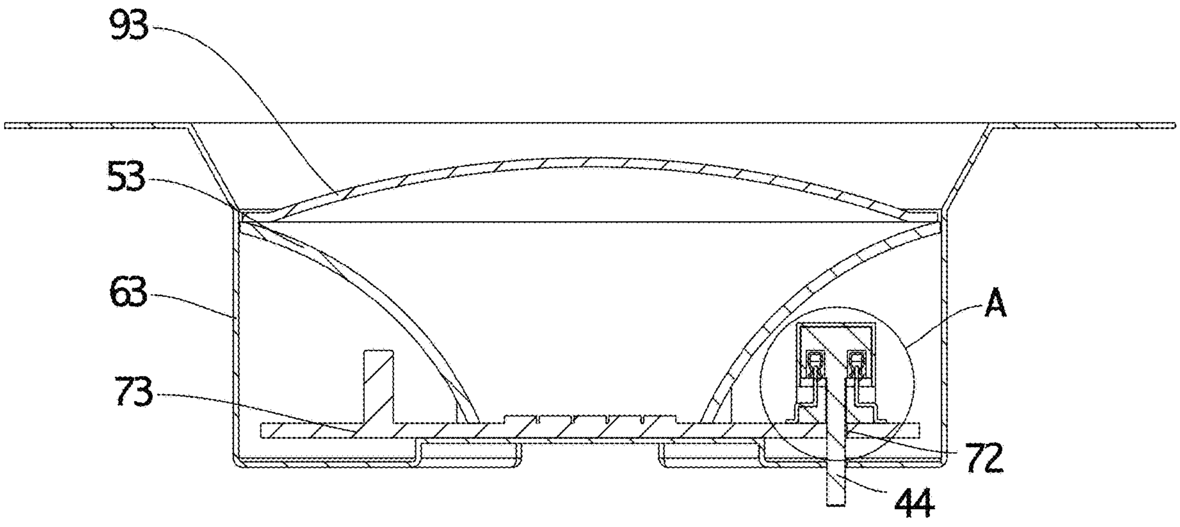
FIG. 6 illustrates a cross-sectional view of the example in FIG. 5.
Figure 7:
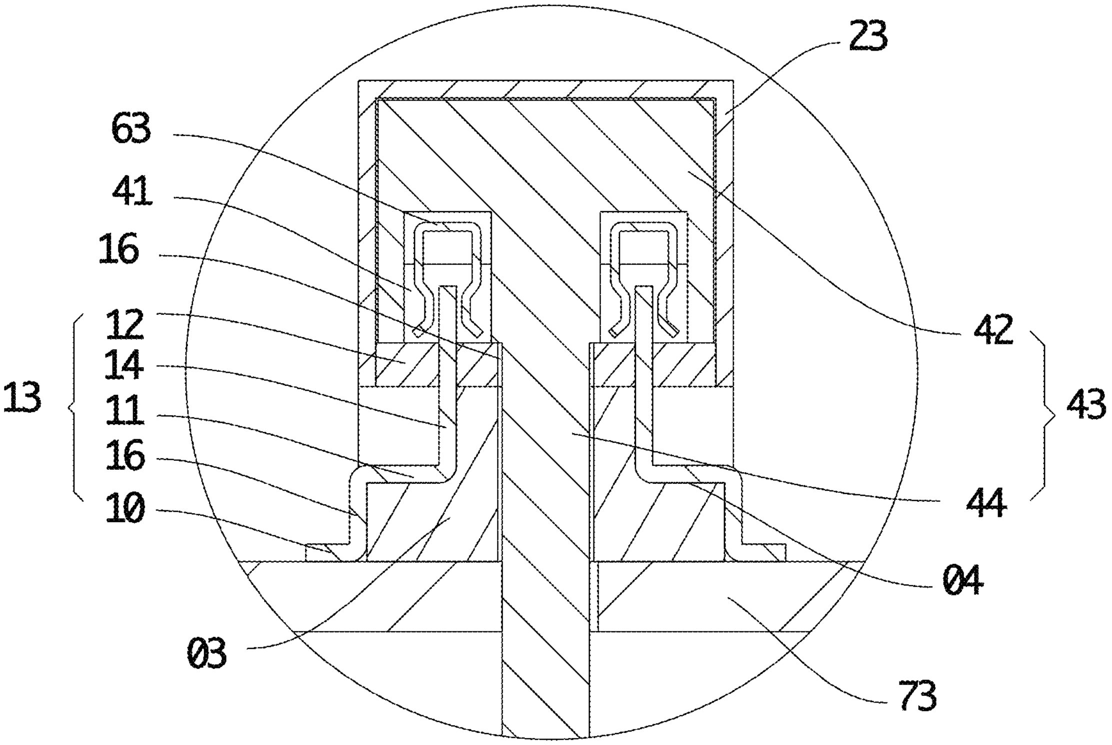
FIG. 7 illustrates a zoom-up view of the cross-sectional view on the switch.

Based on the same inventive concept, referring to FIG. 5 to FIG. 7, this application embodiment also provides a lighting apparatus that includes the above inverted DIP switch, along with a face ring 60, a light engine board 70 (the aforementioned PCB board), a reflector cup 80, and a light-transmitting cover 90. The side wall of the face ring 60 opposite to the light-emitting direction has a third through-hole 71. The light engine board 70 is installed inside the face ring 60 and has a fourth through-hole corresponding to the third through-hole 71. The reflector cup 80 is installed inside the face ring 60 and located on the light-emitting direction side of the light engine board 70. The light-transmitting cover 90 is installed inside the face ring 60 and located on the light-emitting direction side of the reflector cup 80. The inverted DIP switch is located inside the face ring 60 and around the outer periphery of the reflector cup 80. The pin wires 32 connect to the light engine board 70, and the handle 22 passes through both the fourth through-hole and third through-hole 71 to extend outside.

Compared to the prior art, in this embodiment's lighting apparatus, after installing the light engine board 70 into the face ring 60, the inverted DIP switch is installed on the light engine board 70. The switch handle of the DIP switch passes through the fourth through-hole and the third through-hole 71 to extend out from the side of the face ring 60 opposite to the light-emitting direction. The pin wires 32 of the DIP switch connect to the light engine board 70. After connection, the reflector cup 80 and light-transmitting cover 90 are installed. The assembly can be used normally after completion. In this utility model, the DIP switch is installed in an inverted manner, with the handle 22 directly extending out from the side of the face ring 60 opposite to the light-emitting direction. No transition component is needed. Compared to having the handle 22 inside the lighting apparatus, the DIP switch in this embodiment occupies less space inside the lighting apparatus. The overall volume of the lighting apparatus can be reduced accordingly, making it more suitable for indoor installation. The cost is also lower, allowing for a lower price and easier promotion.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a LED light source;

a driver circuit;

a light source plate, wherein the LED light source and the driver circuit are mounted on a front side, wherein the light source plate has a switch hole;

a manual switch module wherein the manual switch module has a switch body, a switch electrode, a movable area, and a manual lever, wherein the manual lever passes through the switch hole and protruding above a back side of the light source plate, wherein the switch body is disposed on the front side of the light source plate, wherein the switch electrode is attached on the front side of the light source plate and electrically connected to the driver circuit, wherein the manual lever is movable within the movable area to adjust a setting of the driver circuit.

2. The lighting apparatus of claim 1, wherein the light source plate has a central area and a peripheral area, wherein the driver circuit is disposed in the peripheral area, wherein the LED light source is placed at the central area.

3. The lighting apparatus of claim 2, further comprising a reflective unit, wherein the reflective unit has a bottom opening and a top opening, wherein the top opening has a larger diameter than the bottom opening, wherein the LED light source emit a light from the bottom opening of the reflective unit to the top opening.

4. The lighting apparatus of claim 3, wherein a portion of the manual lever is exposed outside a light housing.

5. The lighting apparatus of claim 4, wherein the manual switch module further includes two conductive clips disposed on the switch body, wherein the two conductive clips correspond one-to-one with two sets of pin wires, wherein each conductive clip clamps one end of the corresponding set of pin wires extending into the exterior housing.

6. The lighting apparatus of claim 5, wherein a side wall of the switch body near the first side is recessed to form two grooves, wherein each conductive clip is snap-fitted into one of the grooves.

7. The lighting apparatus of claim 6, wherein the top plate is embedded in the switch body, the two clamping plates are positioned within the grooves, wherein the middle portion of each clamping plate is arched toward the other clamping plate to form a clamping portion, and the clamping portions of the two clamping plates cooperate to clamp the corresponding set of pin wires.

8. The lighting apparatus of claim 4, wherein one end of the pin wires extending out of the exterior housing is provided with a first connection segment, wherein one end of the first connection segment is fixedly connected to the pin wires, and the other end extends in a direction away from the handle.

9. The lighting apparatus of claim 8, wherein the other end of the first connection segment is sequentially provided with a second connection segment and a third connection segment, wherein the second connection segment is parallel to the pin wires, and the third connection segment is parallel to the first connection segment.

10. The lighting apparatus of claim 9, further includes a stopper fixedly connected to the first side of the exterior housing, wherein the stopper includes a second through-hole corresponding vertically to the first through-hole, and the pin wires and the first connection segment are embedded in the stopper.

11. The lighting apparatus of claim 10, wherein both opposite side walls of the stopper are recessed to form through-slots corresponding one-to-one with the two sets of pin wires, wherein each through-slot includes a stepped surface, and the stepped surfaces are respectively attached to the first connection segment and the second connection segment.

12. The lighting apparatus of claim 10, wherein the stopper is a plastic component or an iron component.

13. The lighting apparatus of claim 4, wherein the switch body is attached with the exterior housing, where a safety distance more than 1.8 mm exists between the switch body and the exterior housing.

14. The lighting apparatus of claim 3, further comprising a light housing, wherein the light source plate and the reflective unit are disposed in the light housing, wherein light housing and the reflective unit defines a concealing space, wherein the driver circuit is placed in the concealing space.

15. The lighting apparatus of claim 14, wherein the light housing has a surface rim to cover an installation hole, wherein the light housing forms a downlight device shape.

16. The lighting apparatus of claim 3, wherein the driver circuit is concealed by the reflective unit and thus invisible from the top opening of the reflective unit.

17. The lighting apparatus of claim 3, wherein the reflective unit is used as a vibrating diaphragm of a speaker.

18. The lighting apparatus of claim 17, wherein a speaker circuit is placed in the concealing space.

19. The lighting apparatus of claim 18, wherein the concealing space is used as a resonance box for enhancing and amplifying a sound wave driven by the speaker circuit.

20. The lighting apparatus of claim 19, wherein a bass reflex port is disposed between the light source plate and the reflective unit.

* * * * *